United States Patent
Lieners et al.

(10) Patent No.: US 10,331,114 B2
(45) Date of Patent: Jun. 25, 2019

(54) METHOD AND SYSTEM FOR PRODUCING A PHARMACEUTICAL PRODUCT USING A MES

(71) Applicant: SIEMENS AKTIENGESELLSCHAFT, Munich (DE)

(72) Inventors: Jean-Jacques Lieners, Karlsruhe (DE); Frédéric Pellé, Toulouse (FR); Nuno Rodrigues Castanheira, Labege (FR)

(73) Assignee: Siemens Aktiengesellschaft, Munich (DE)

( * ) Notice: Subject to any disclaimer, the term of this patent is extended or adjusted under 35 U.S.C. 154(b) by 700 days.

(21) Appl. No.: 14/534,402

(22) Filed: Nov. 6, 2014

(65) Prior Publication Data
US 2015/0134092 A1 May 14, 2015

(30) Foreign Application Priority Data

Nov. 6, 2013 (EP) ..................... 13290272

(51) Int. Cl.
*G05B 19/418* (2006.01)

(52) U.S. Cl.
CPC ... *G05B 19/4188* (2013.01); *G05B 19/41835* (2013.01); *G05B 2219/31372* (2013.01); *G05B 2219/31449* (2013.01); *Y02P 90/12* (2015.11); *Y02P 90/20* (2015.11)

(58) Field of Classification Search
CPC .......... G05B 19/4188; G05B 19/41835; G05B 2219/31372; G05B 2219/31449; Y02P 90/12; Y02P 90/20
See application file for complete search history.

(56) References Cited

U.S. PATENT DOCUMENTS

| 2006/0184264 | A1  | 8/2006  | Willis et al. |
| 2006/0259154 | A1* | 11/2006 | Hood ................. G05B 19/4188 700/2 |
| 2008/0103617 | A1* | 5/2008  | Subramanian ......... G06Q 10/06 700/96 |
| 2009/0088871 | A1  | 4/2009  | Moor et al. |
| 2009/0105866 | A1* | 4/2009  | Fontanot ............ G05B 19/4183 700/112 |
| 2010/0161097 | A1* | 6/2010  | Depreter ................ G06Q 10/06 700/100 |

(Continued)

FOREIGN PATENT DOCUMENTS

| CN | 102314631 A | 1/2012 |
| CN | 102880123 A | 1/2013 |
| EP | 2595100 A1  | 5/2013 |

*Primary Examiner* — Charles E Anya
(74) *Attorney, Agent, or Firm* — Laurence Greenberg; Werner Stemer; Ralph Locher (57) ABSTRACT

A method produces a pharmaceutical product using a manufacture execution system (MES), and an automation system, such as a batch system. The automation system is configured to drive and to monitor production machines located at a plant floor level. The method is characterized in that it communicatively couples the MES with the automation system, it receives at the MES from the automation system at least one event representative of a situation that has occurred at the plant floor level and relative to the machines, and it depends on the event received at the MES starting at least one workflow controlled by the MES.

7 Claims, 7 Drawing Sheets

(56) References Cited

U.S. PATENT DOCUMENTS

| | | | |
|---|---|---|---|
| 2010/0256816 A1* | 10/2010 | Popp | G05B 23/0224 |
| | | | 700/268 |
| 2011/0022209 A1* | 1/2011 | Ocke | G06Q 10/06 |
| | | | 700/104 |
| 2012/0096463 A1* | 4/2012 | Agarwal | G06Q 10/0633 |
| | | | 718/100 |
| 2013/0123963 A1* | 5/2013 | Cooper | G05B 19/02 |
| | | | 700/95 |
| 2013/0123964 A1 | 5/2013 | Cooper et al. | |
| 2013/0124253 A1* | 5/2013 | Cooper | G06Q 10/067 |
| | | | 705/7.26 |
| 2013/0173038 A1* | 7/2013 | Kashyap | G05B 23/0213 |
| | | | 700/95 |

\* cited by examiner

METHOD AND SYSTEM FOR PRODUCING A PHARMACEUTICAL PRODUCT USING A MES

CROSS-REFERENCE TO RELATED APPLICATION

This application claims the priority, under 35 U.S.C. § 119, of European application EP 13 290 272.7, filed Nov. 6, 2013; the prior application is herewith incorporated by reference in its entirety.

BACKGROUND OF THE INVENTION

Field of the Invention

The present invention relates to a method and system for monitoring, controlling and driving production of pharmaceutical products.

A method for managing and controlling manufacturing and/or analysis processes planned by an enterprise resource planning (ERP) and produced by a technical process line, provides in the environment of a manufacturing executing system (MES) an automation system for implementing the planned analysis processes and controlling the corresponding workflow steps at the level of the technical process line.

In particular, the enterprise resource planning (ERP) is a system including hardware devices and corresponding software applications for planning the business resources of an enterprise, i.e. material provisions, human resource managements, purchasing, orders, profits, finance, inventory controls, customer managements, etc., while the term "technical process line" refers to a system supporting the control of single machines involved in the analysis processes, for example by measuring the number of pieces handled per hour by each machine or the functioning parameters thereof, the quality of the analysis results and so on.

MES is an intermediate layer providing computing machines and software tools between the ERP upper layer and the process line lower layer, including a software tool for analysis management, which receives requests of analysis from the ERP, and a software tool for productive process, which supports the phases of selecting and managing the resources to be involved in the productive processes, i.e. employees, machines and materials, in order to realize a planned analysis process within required time constraints.

MES is based on the International Standard Association (ISA) standard S95 which defines how software tools may implement the productive process at plant floor level and how to communicate with it. Beside the productive process itself, it is crucial for many industries to control the productive process in terms of analysis, measurements and traceability of the products, like for example for pharmaceutical industry, food industry, high-tech industry, or for industries where the productive process itself is a process of analyzing a sample, i.e. medical diagnostic analysis, material science analysis, drug scanning and so on.

In the pharmaceutical production industry, for obvious regulatory reasons, it is compulsory that each step of production realized either by a human being or by a piece of equipment be traced, and when necessary electronically signed and/or validated at a higher level by an authorized person. This authorized person is recognized by the national regulatory authority as having the responsibility for ensuring that each batch of finished product has been manufactured, tested and approved for release in compliance with the laws and regulations in force in that country. These specific actions can be realized by a dedicated manufacturing execution system (MES) provided with embedded procedures and data bases where all data relative to the production are saved for subsequent analysis and validation of batches produced.

A pharmaceutical MES is therefore a manual instruction system that gives operating instructions to production operator and collects the corresponding information automatically from validated equipment and manually from the technician with a confirming electronic signature. It fosters consistency throughout the production process or the manufacturing facility by allowing instructions and corresponding data to be retrieved from a common master recipe database, thereby ensuring less chance of introducing errors. MES can be integrated with automated equipment and sent start and stop instructions and, at the same time, can collect process information automatically.

A batch system is an automation system part of the lower layer. The batch system provides computing machines and software tools to drive and monitor pieces of equipment at the plant floor level. A batch system contains a set of basic recipes, which defines steps for driving a piece of equipment in order to realize a given basic task. In other words, the batch system controls actuators of a piece of equipment in order to perform a given task at the plant floor level.

In plants without a MES layer, traceability is realized via a ticket system. This means that the operators write on paper forms results of different steps of the of the production process realized at the plant floor level, but also the different physical values (for example, temperature of an intermediate product at a given time) and the status of a piece of equipment needed for validation purposes. This increases the risk of human errors in reporting, and increase the risk that a non-conforming batch of products be approved.

There is therefore a need in cases where only a batch system exists to provide a solution for a reliable reporting system which can collect and store the information relative to the production and diminishes the reporting errors.

The batch system drives the actuators of a given piece of equipment at the plant floor level and also receives information relative to the state of a piece of equipment thanks to sensors. The batch system is also provided with memories wherein raw data directly linked to the piece of material and coming from the sensors are stored. A type of data can be, for example, the temperatures of a mixture taken every millisecond. Even if the raw data represents what has occurred during the production process, given the quantity of the raw data and their form (information close to the machine and its language), the data are not directly usable by a human being, and can of course not be used for analysis, reporting or validation purposes. Furthermore, finding a particular piece of information needed to validate a batch of finished products requires analysing the entire set of raw data provided for the whole plant by the batch system.

There is therefore a need for a system and a method able to obtain only relevant information from a batch system and able to present information coming from the batch system in a form which facilitates interpretation and analysis by a human being which needs to make decisions.

In current batch systems, there already exists an event system which throws software events when a predetermined situation occurred while a given piece of equipment at the plant floor level is running. However, to be able to listen to one or more events requires up to now modification of procedures or functions manipulate the events within the batch system itself. Definition of the different kinds of events, which are indeed very close and relative to the piece of equipment, are part of the master recipe which defines at a high level the steps that need to be realized to obtain the final product. This means that changing or manipulating events, relative only to the low level piece of equipment, within the batch system itself, requires the re-validation of an entire high level master recipe. This is time and cost consuming because this requires new validation steps and implication of an authorized person.

Master recipes are a set of high level steps needed to produce a given sensitive product and are defined in the M.E.S. These master recipes need to be compliant with existing regulations in one or several country. For example, in case of production of a pharmaceutical product, an authorized person needs to certify that the recipe complies with the currents regulation before starting the production based on the master recipe. This validation process is time and money consuming.

The batch system low level sub-recipes which basically drive pieces of equipment at the plant floor level are part of the master recipe. This means that there is a too close relationship between the pieces of equipment (or machines) and the master recipe which is not supposed to know the details of the pieces of equipment located at the shop floor. This close relationship results in the fact that if a piece of equipment is changed, or if a procedure related specifically to the equipment needs to be changed, the master recipe itself needs to be changed and approved by an authorized person.

Furthermore, this also obliges the master recipe designer to take into account all possible variations of type of equipment and all possible situations which may occur at shop floor in the master recipe itself. This leads to very complicated master recipe difficult to maintain and to change.

There is therefore a supplemental need for methods and systems which avoids the need to modify a master recipe in case of changes of a piece of equipment at the shop floor level and which consequently also avoid all validation steps.

There is also a need for methods and system which helps to take into account and modify the behaviour of a piece of equipment without necessity to take into account all possibility beforehand in the master recipe, the methods and systems helping to have less complicated master recipes.

There is therefore a need to encapsulate changes which have no real impact on the master recipe to avoid unnecessary rewriting of master recipe because of a material change, because this costs time and money.

SUMMARY OF THE INVENTION

It is therefore an objective of the present invention to provide a method and a system for solving the above mentioned problems.

The objective is achieved according to the present invention in a first aspect by a method for producing a pharmaceutical product using a MES, and an automation system, such as a batch system. The automation system being configured to drive and to monitor production machines located at the plant floor level. The method being characterized in that it includes:
a) communicatively coupling the MES with the automation system;
b) receiving at the MES from the automation system at least one event representative of a situation that has occurred at the plant floor level and relative to the machines; and
c) depending on the event received at the MES starting at least one workflow controlled by the MES.

According to other features taken alone or in combination: the method further comprises:
a) communicating with the at least one event at least one parameter relative to the at least one event to the MES;
b) using the at least one parameter received with the event for configuring the process started by the MES;
c) the MES starts at least one main workflow the main workflow starting in turn a second workflow within the automation system, the second workflow sending the at least the at least one event to the main workflow;
d) upon reception of the at least one event, the main workflow starts at least one sub-workflow chosen between a plurality of sub-workflows; and
e) the sub-workflow started depends on the received event.

The invention also concerns in a second aspect a manufacturing execution system (MES) configured to monitor and to drive the production of a pharmaceutical product. The MES contains:
a) connecting means to commutatively coupling the MES with an automation system driving and monitoring at least one machine used in the production of a pharmaceutical product;
b) means for intercepting at least one event coming from the automation system;
c) means for analyzing the event received from the automation system; and
d) means for starting a specific action depending on the type of event received.

In a third aspect the invention concerns a system for producing a pharmaceutical product, the system containing at least one MES and one automation system, such as a batch system. The automation system being configured to control a set of production machines and to receive information relative to the production machines and relative to the production process, the information coming from a plurality of sensors connected to the production machines. The MES is communicatively coupled to the batch system to receive information relative to the production of the pharmaceutical product and to the pharmaceutical production process. The system being characterized in that the automation system is configured for raising at least one event when a specific situation happens at a plant floor level and in that the MES is configured for receiving the at least one event and for starting at least one action depending on the type of event received.

The concept of the invention is therefore the fact that the MES is driven by the batch process (the automation system). In other words an event arriving from the batch process will trigger action in the MES. This solution is particularly useful in case a batch system already exists in a plant, and in case a pharmaceutical producer wants to add a M.E.S. layer in particular for reporting and validation purposes.

Other features which are considered as characteristic for the invention are set forth in the appended claims.

Although the invention is illustrated and described herein as embodied in a method and a system for producing a pharmaceutical product using a MES, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

In a MES according to the invention, a master recipe can be configured. The master recipe defines the steps that the operators and the production machines need to follow in order to obtain a pharmaceutical finished product. The set of steps is also called a high level workflow or main workflow.

In a batch system, a low level workflow is also configured. Each of the low level workflows, contains a set of steps that the production machines have to follow in order to execute correctly a given production task needed to the completion of the high level workflow. In the case of a mixing machine, the low level workflow may indicate the speed of the mixing, the duration of the mixing and which actuators to be used.

The MES according to the invention drives all the processes, starts its own high level work workflow, starts the batch low level workflow, and wait till the end of the batch workflow to continue the process.

According to the invention, during execution of the low level batch workflow, the batch system is configured to send events. The MES catches the event and starts specific actions. The raising of an event can happen for example when:
a) a phase is started,
b) a phase is completed or aborted, and
c) a special event is called during the execution of a phase to synchronize systems.

Even if not shown in the figure, it will be understood that the MES is communicatively connected with the batch system in order to exchange information and instructions.

Figure 1:
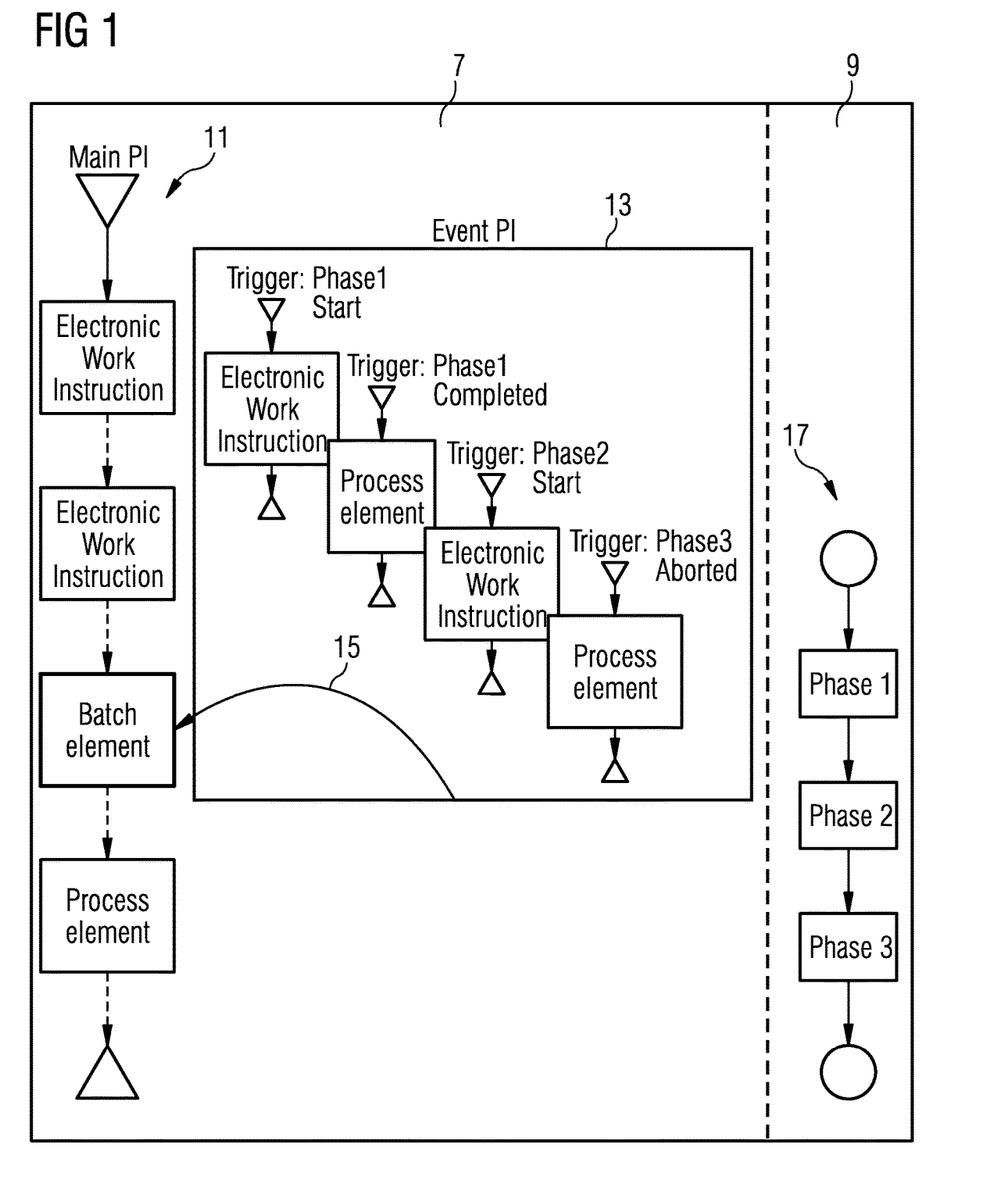
FIG. 1 is a diagram representing in a design phase a setting of different workflows contained in a manufacturing execution system which will react depending on events coming from a batch system according to the invention.

FIG. 1 describes how events arising in the batch system 9 are linked to actions that the MES 7 starts.

As can be seen in FIG. 1, two different types of workflow are configured in the MES 5:
a) the main workflow 11 also called "Main Process Instruction" (Main PI), which is a normal workflow where the tasks are sequentially realized; and
b) event workflows 13 also called Event Process Instruction (Event PI) which are started by the MES upon receipt of an event coming from the batch system.

A normal workflow or Main PI is created and executed when a work order comes from the ERP is received by the MES.

An Event workflow or Event PI is executed only if the MES receives the associated event from the batch system. The Event Workflow can be seen as a sub workflow in the main one.

There are therefore 3 types of workflows:
a) Normal workflow or main workflow (MES),
b) Batch workflow (Batch system), and
c) Event workflow or event PI (MES).

This means that a complete workflow is composed of a main workflow, one or a plurality of batch workflows, and a plurality of event workflows.

Each event coming from the batch system is labeled with an appropriate identifier. Thanks to the identifier a link 15 is established between each event and each Event workflow in a design phase shown in FIG. 1.

In the running phase, when the MES 7 receives an event from the batch system 9 because a predefined situation has occurred at the plant floor level, the MES 7 runs automatically the event workflow that has previously been linked or attributed to this event.

Figure 2:
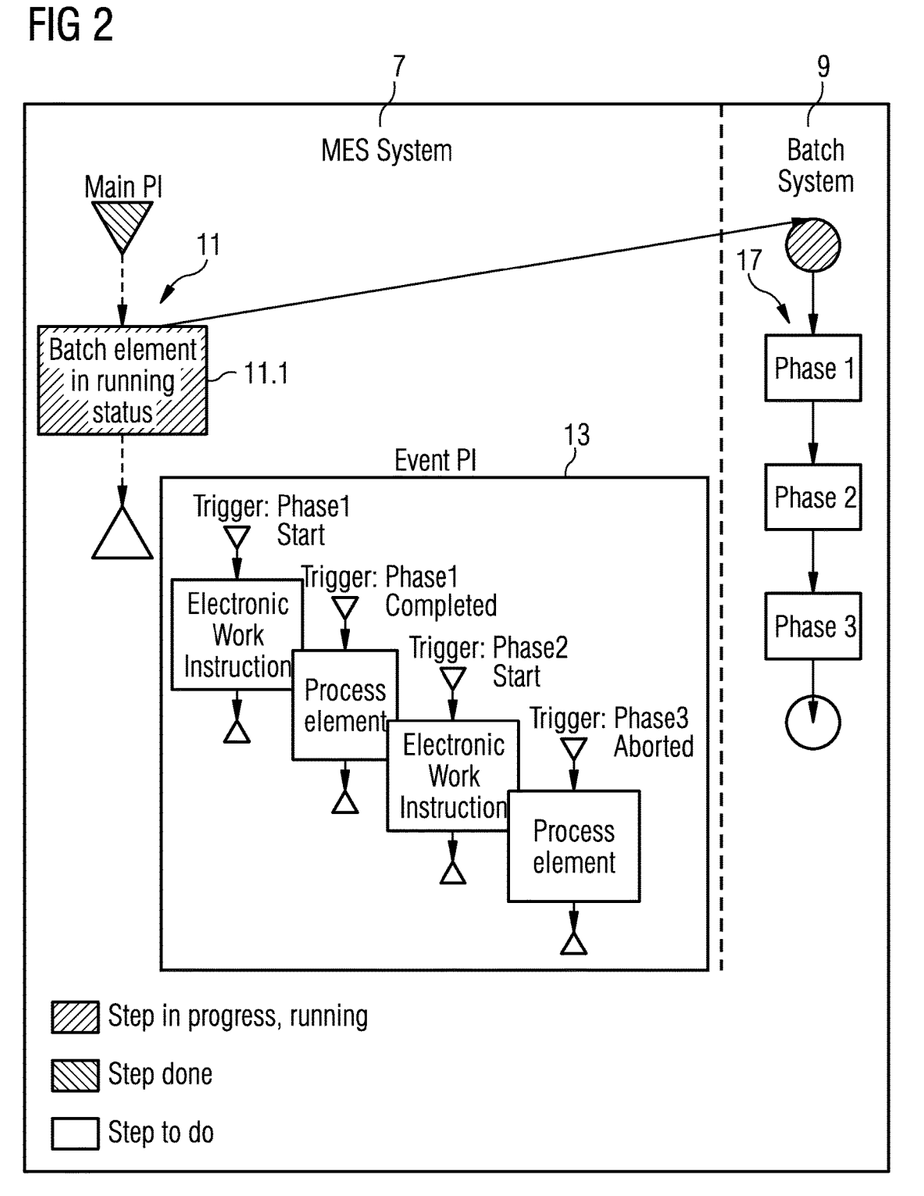
FIG. 2-7 are diagrams representing in a running phase different interactions of the MES and batch system workflows.
Figure 3:
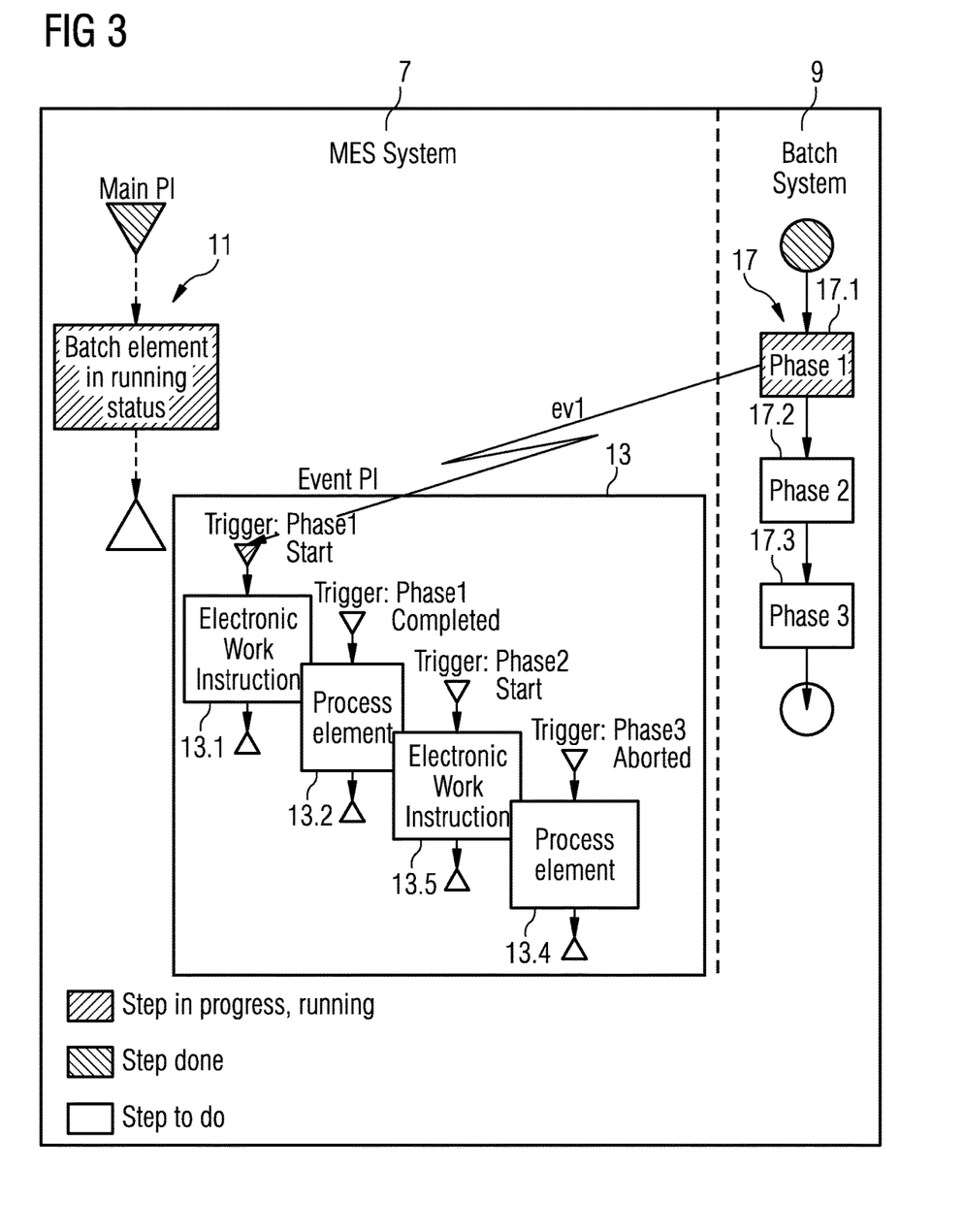

Referring now to FIG. 2, it will be understood that only step 11.1 of the main workflow 11 of the MES 7 has been represented. In step 11.1, the main workflow 11 creates a batch workflow or process 17 within the batch system 9, starts the batch process 17, and enters into a waiting loop.

At step 17.1, a batch phase 1 starts; and the batch system 9 sends a notification in the form of an event ev1 to the MES 7. The MES 7 analyses the notification or event, and starts the dedicated event workflow 13.1. The event workflow is seen as a sub-workflow for the main workflow or process 11.

In this example, the chosen event is a phase start event. The event indicates to the MES that a phase 1 has started. Other notifications, such as for example a synchronization request can be sent in order to synchronize MES and the batch system.

Figure 4:
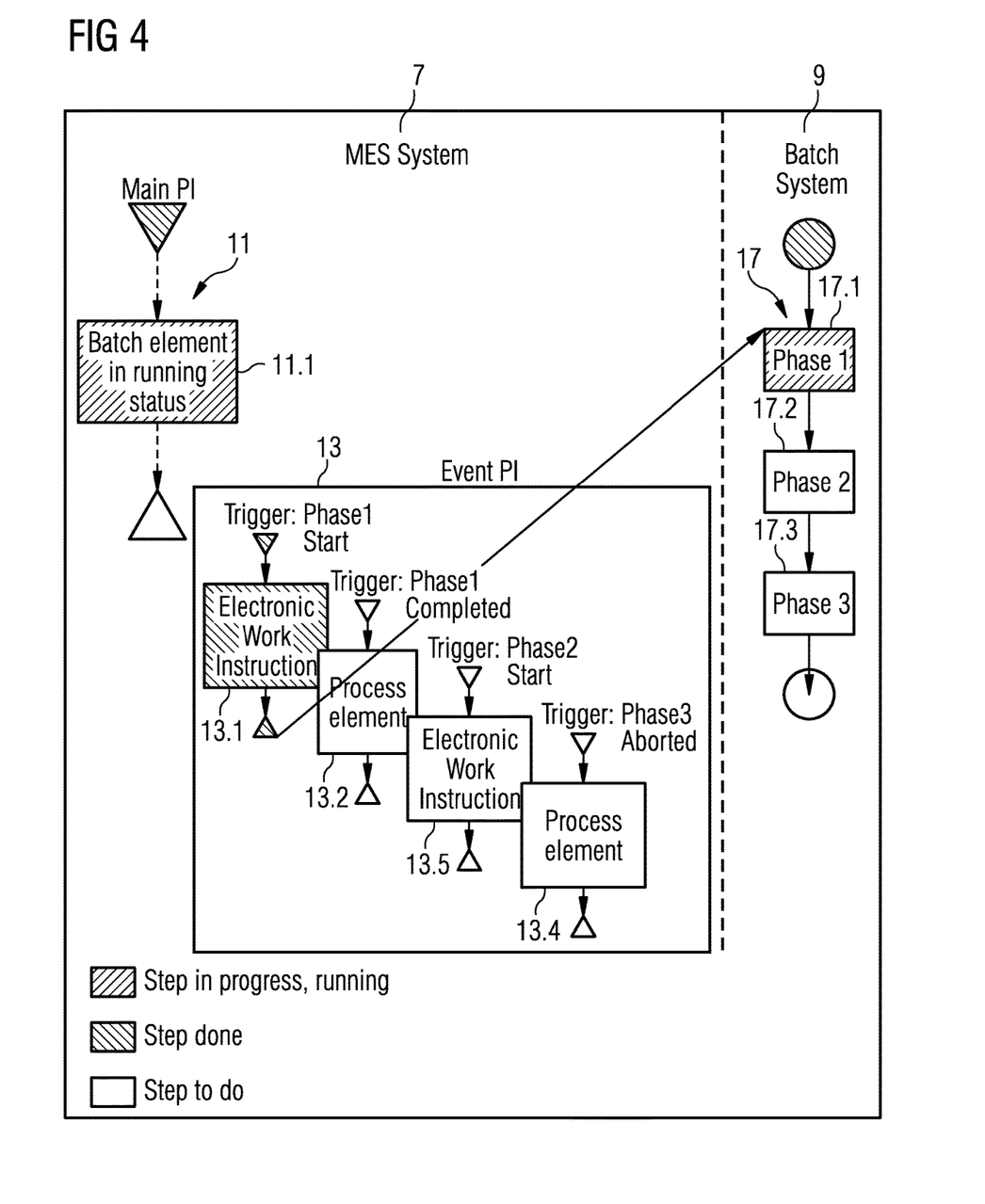

As can be seen on FIG. 4, at step 13.1, when the first event workflow is completed, MES 7 sends an instruction to batch system 9, to continue execution of the batch process.

Figure 5:
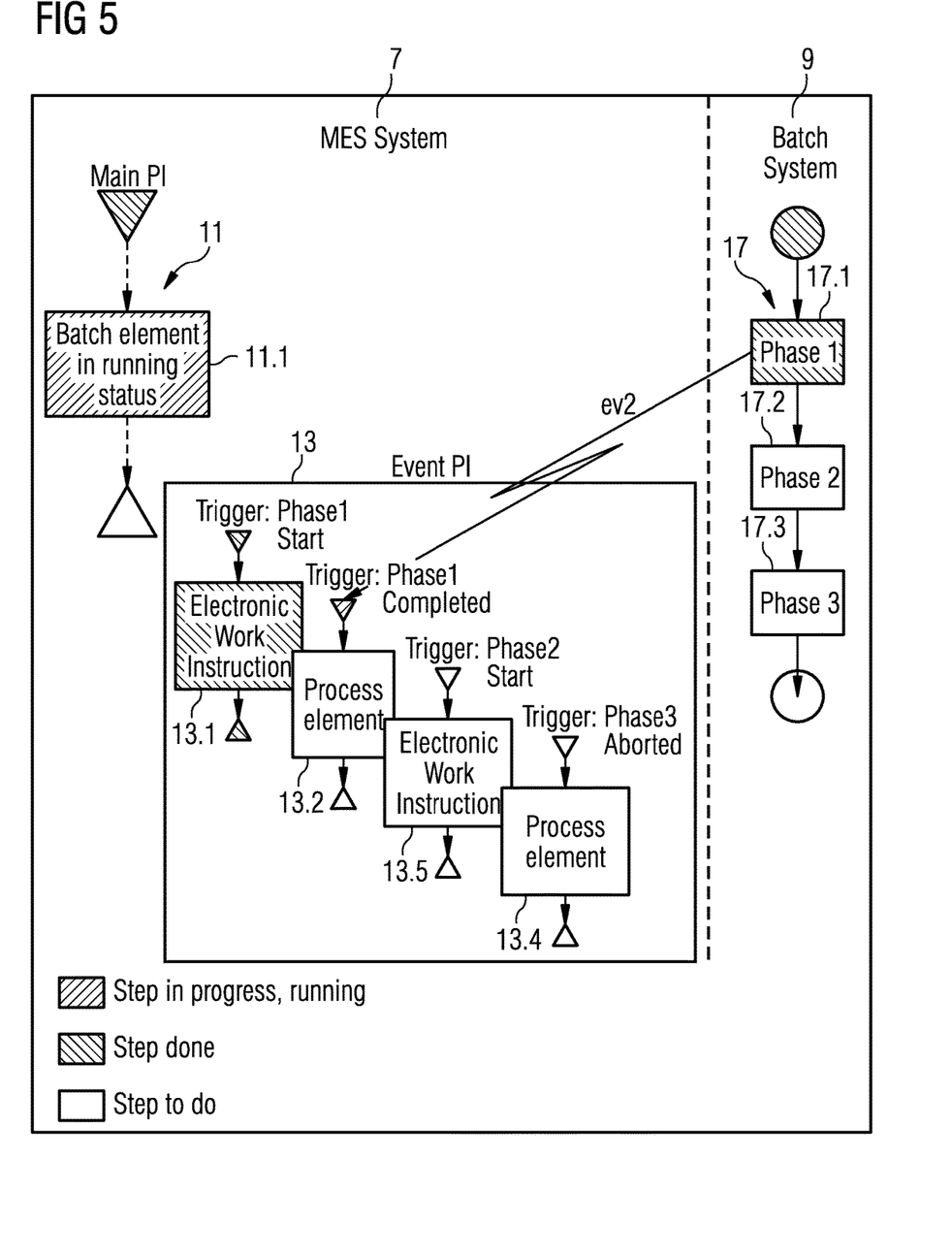

Subsequently, as can be seen in FIG. 5, the batch phase 1 ends, and at step 17.1 the batch system 9 sends an end of phase 1 event ev2 to the MES 7. The MES analyses this event, and starts the dedicated event workflow 13.2. The event workflow 13.2 is considered as a sub workflow for the main workflow 11.

Figure 6:
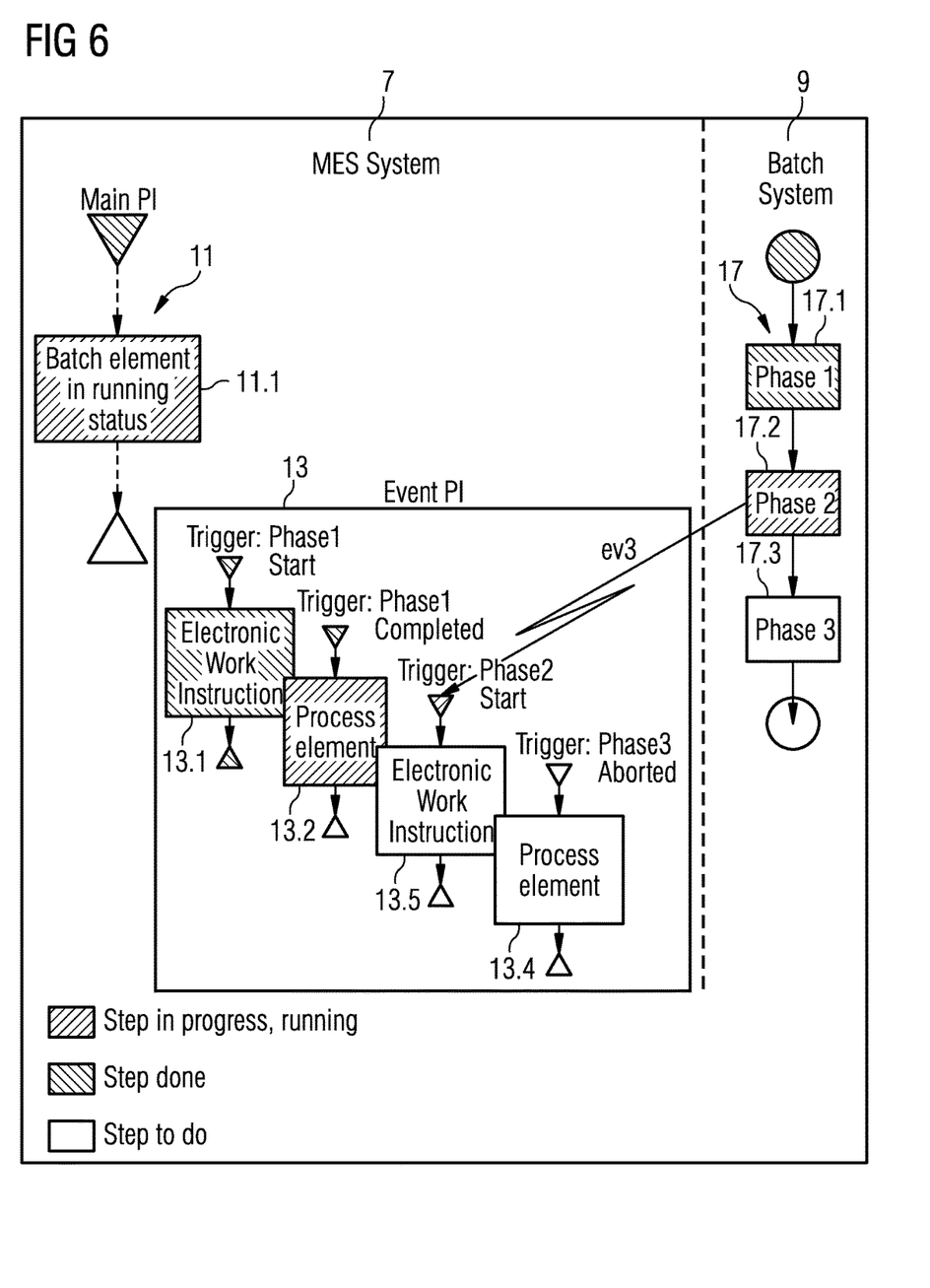

As can be seen on FIG. 6, at step 17.2, the batch phase 2 starts and sends a start of phase 2 event ev3 to MES 7. The MES 7 analyses the notification, and starts the dedicated event workflow 13.3. This event workflow is again considered as sub workflow for the main process.

This succession of starts of event workflows based on event received by the MES from the batch system is continued until all steps or phases of the batch system are completed.

Figure 7:
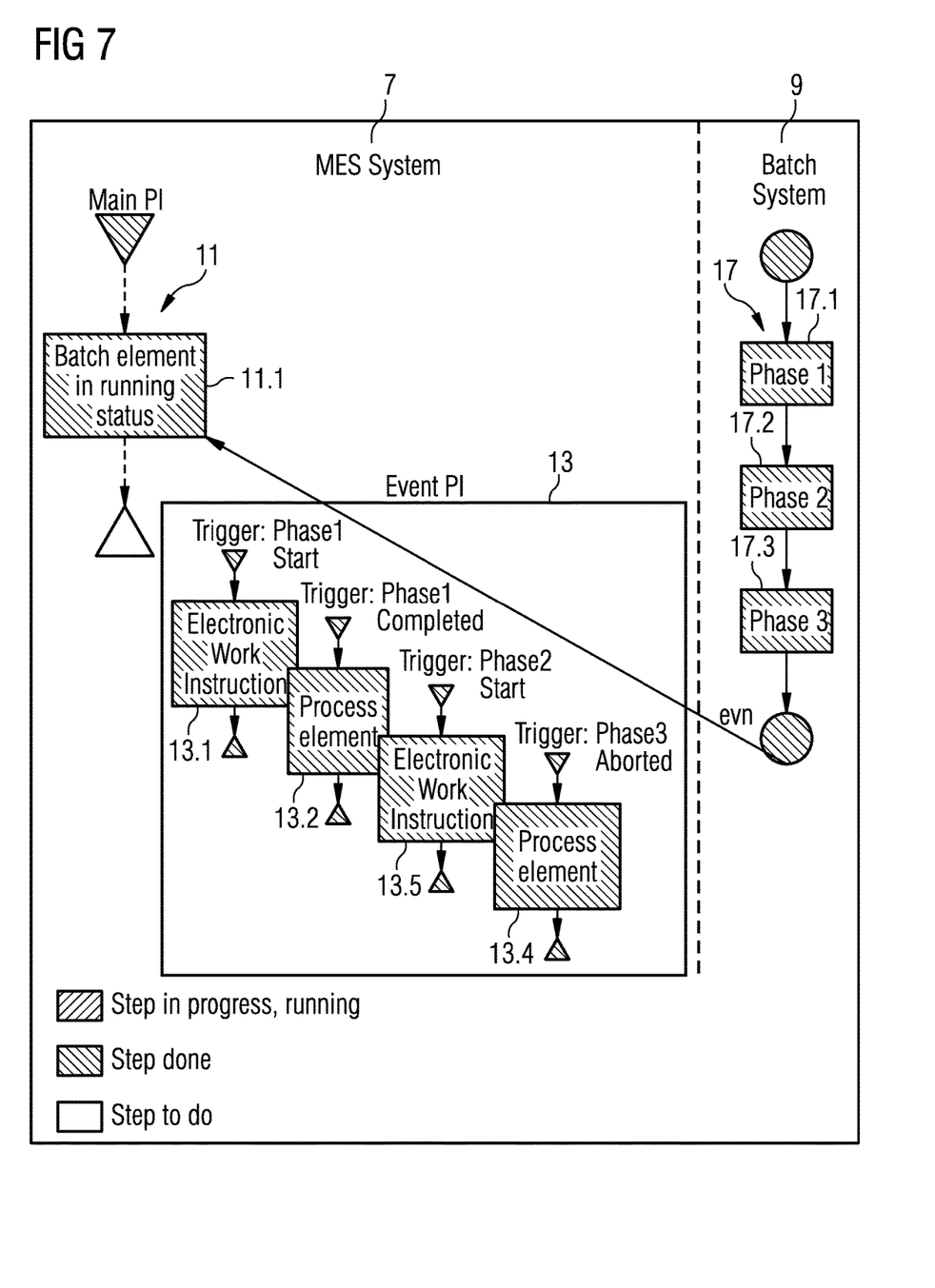

As shown in FIG. 7, when the batch process is completed; the batch system sends an end of batch "evn" process event to MES to exchange parameters and to allow the MES process to continue.

An event workflow can be:
a) Asynchronous: The batch workflow continues it execution in parallel to the event workflow; or
b) Synchronous: The batch workflow waits until end of execution of the event workflow and continues when it receipts an acknowledgment.

Only one event workflow can be defined for a batch phase event. But several events can be defined for a batch phase, so the number of parallel running event workflow could be high.

During execution of the main workflow 11 and of an event workflow 13.1-13.$n$, data context can be exchanged between the two different workflows. The data context is used to exchange values of critical data between these processes. This means for example, that information concerning the status of a given machine at the plant floor level can be communicated by the batch system to the MES, using the event architecture.

The above mentioned architecture can be used to realize a great number of tasks needed to obtain a pharmaceutical finished product. In one embodiment, one of these tasks is a pH adjustment.

When the MES 7 needs to realize a pH adjustment, because this is required by the master recipe, the MES asks the batch system 9 to handle this process by starting a pH adjustment workflow in the batch system 9. See FIG. 2.

Machines controlled by the batch system test the pH of a given mixture. The testing corresponds to one of the phase 17.*n* shown on the drawings.

In case the result of the test is too acid, there is a need of additional water. The batch system 9 sends an event (comparable to ev2 of FIG. 5) to MES indicating that MES has to add water to the mixing.

The MES receives the notification and starts the corresponding "pH correction" event workflow, for example one of the workflow event 13.*n* shown on the figures. This event workflow, during its running, sends a message to an operator requesting that one liter of water be added to the mixture. The operator performs the action and validates in the MES using a User Interface. The MES controls that the quantity of water added by the operator is correct.

The MES sends an event to batch system indicating that the batch system needs to test the pH value once more.

Subsequently, the batch system tests again the pH and sends an event to the MES indicating that the pH value is correct.

The batch system ends its task and notifies to the MES the process is finished. The MES ends the execution of batch task and all processes are subsequently closed.

The event workflows 13.1-13.*n* can have different forms. For example, it can be a workflow which requests from the batch system data relative to the current status of the machine, and which draws curves or other kind of reports understandable by a human being. This avoids reporting errors made by operators during transcription of values. This also avoids the need to search within a great amount of data relative to the machines the one needed for a finished product validation.

Another event workflow can be the cleaning of a specific piece of equipment at plant floor level. In this case, the batch system sent an event to indicate that the piece of equipment, for example a mixer, has finished it mixing task. Upon reception of this event, the main workflow starts the cleaning event workflow. As above mentioned, with the event raised by the batch system, contextual information can also be communicated to the MES. For example the type of product mixed, the size of mixer, and other parameters, can be communicated with the event. The contextual information is used by the MES to set the corresponding event workflow. The corresponding workflow then starts the cleaning of the equipment with, for example the good cleaning duration, calculating thanks to the contextual information sent with the event. Thanks to this procedure there is no more need that an operator waits for the end of the mixing phase and start himself the cleaning step. The machine itself notifies its end of task and the cleaning phase is automatically started with the correct parameters.

The systems and methods according to the invention have the now described advantages.

First, it is the easiest solution to manage the event processing between the two systems. Before the invention the MES didn't interact with the batch system. The exchange of data with the automation layer was only done via an Equipment Procedural Element (EPE) with a script interface and only concerned instant data directly linked to a piece of equipment. Each EPE had to be specified for a class of equipment. There was no interaction between the workflow of the MES System on one side and the workflow of the batch system on the other side.

Second, it is very flexible, all kind of events can be managed.

Third, it is based on an XML definition, and is therefore easy to configure.

Fourth, a pharmaceutical manufacturer who has a batch system and who wants to improve the way it works, can use the MES according to the invention not to use paper anymore. The traceability is therefore increased.

Fifth, each pharmaceutical manufacturer can create their own process. There is no more need of a software engineer to set the software. With the event workflow concept all is made in the configuration phase. The user himself can set the event he wants.

The invention claimed is:

1. A method of producing a pharmaceutical product using a manufacturing executing system (MES) and an automation system, the automation system configured to drive and to monitor production machines disposed at a plant floor level, which method comprises the steps of:
   communicatively coupling the MES with the automation system and at least a main workflow being started in the MES, wherein the main workflow include tasks being sequentially realized;
   performing a batch workflow in the automation system based on instructions derived from the main workflow and entering into a waiting loop;
   receiving, at the MES, from the automation system at least one event representative of a situation that has occurred at the plant floor level and relative to the production machines which occurred during the batch workflow, wherein the automation system is a batch system and wherein the least one event representative includes an identifier used to link the least one event to at least one event workflow;
   automatically, starting the at least one event workflow controlled by the MES as a sub-workflow of the main workflow based on the identifier of the least one event received at the MES and not under control of the batch workflow, wherein the at least one event workflow include an asynchronous event workflow or a synchronous event workflow; and
   transmitting further instructions from the MES to the automation system upon completion of the event workflow.

2. The method according to claim 1, which further comprises:
   communicating with the at least one event at least one parameter relative to the at least one event to the MES; and
   using the at least one parameter received with the event for configuring a process started by the MES.

3. The method according to claim 1, wherein when the MES starts the at least one main workflow, the main workflow starting in turn a second workflow within the automation system, the second workflow sending the at least one event to the main workflow.

4. The method according to claim 3, which further comprises starting in the main workflow within the MES at least one sub-workflow chosen between a plurality of sub-workflows upon reception of the at least one event.

5. The method according to claim 4, wherein the sub-workflow started depends on the event received.

6. A manufacturing execution system (MES) configured to monitor and to drive a production of a pharmaceutical product, the manufacturing execution system comprising:

connecting means for commutatively coupling the MES with an automation system driving and monitoring at least one machine used in the production of the pharmaceutical product, said connecting means having at least a main workflow started in the MES, wherein the main workflow include tasks being sequentially realized;

means for performing a batch workflow in the automation system based on instructions derived from the main workflow and entering into a waiting loop;

means for receiving at least one event coming from the automation system which occurred during the batch workflow, wherein the automation system is a batch system and wherein event includes an identifier used to link the event to at least one event workflow;

means for analyzing the event received from the automation system; and means for automatically starting a specific action depending on a type of the event received as a sub-workflow of the main workflow and based on the identifier of the event and not under control of the batch workflow and for transmitting further instructions from the MES to the automation system upon completion of the specific action, wherein the sub-workflow include an asynchronous sub-workflow or a synchronous sub-workflow.

7. A system for producing a pharmaceutical product, the system comprising:

a manufacturing executing system (MES); and an automation system being a batch system, said automation system configured to control a set of production machines and to receive information relative to the production machines and relative to a production process, the information coming from a plurality of sensors connected to said production machines, said MES being communicatively coupled to said batch system to receive the information relative to production of the pharmaceutical product and to a pharmaceutical production process;

said MES starting at least a main workflow, wherein the main workflow include tasks being sequentially realized;

said automation system performing a batch workflow based on instructions derived from the main workflow and entering into a waiting loop;

said automation system raising at least one event when a specific situation happens at a plant floor level which occurred during the batch workflow and wherein the least one event includes an identifier used to link the event to at least one event workflow; and said MES receiving the at least one event and automatically starting at least one action depending on a type of event received as a sub-workflow for the main workflow and based on the identifier of the event and not under control of the batch workflow, wherein the sub-workflow include an asynchronous sub-workflow or a synchronous sub-workflow; and said MES transmitting further instructions from said MES to said automation system upon completion of the action.

* * * * *